US009580038B2

(12) United States Patent
Palmer et al.

(10) Patent No.: US 9,580,038 B2
(45) Date of Patent: Feb. 28, 2017

(54) TURRET AIR BAGS

(71) Applicant: TenCate Advaned Armor USA, Inc., Newark, OH (US)

(72) Inventors: Paul A. Palmer, Mount Pleasant, SC (US); Andrew R. Hansen, Goleta, CA (US); Josef S. Dobriski, Morgan Hill, CA (US)

(73) Assignee: Tencate Advanced Armor Design, Inc., Goleta, CA (US)

( * ) Notice: Subject to any disclaimer, the term of this patent is extended or adjusted under 35 U.S.C. 154(b) by 0 days.

(21) Appl. No.: 14/767,931

(22) PCT Filed: Feb. 14, 2014

(86) PCT No.: PCT/US2014/016446
§ 371 (c)(1),
(2) Date: Aug. 14, 2015

(87) PCT Pub. No.: WO2014/149272
PCT Pub. Date: Sep. 25, 2014

(65) Prior Publication Data
US 2016/0001731 A1 Jan. 7, 2016

Related U.S. Application Data

(60) Provisional application No. 61/850,405, filed on Feb. 14, 2013.

(51) Int. Cl.
*B60R 21/231* (2011.01)
*F41A 23/24* (2006.01)
(Continued)

(52) U.S. Cl.
CPC ......... *B60R 21/231* (2013.01); *B60R 21/0132* (2013.01); *B60R 21/13* (2013.01);
(Continued)

(58) Field of Classification Search
CPC ........ B60R 21/231; B60R 21/13; B60R 21/20; B60R 21/0132; B60R 2021/01034; B60R 2021/0018; B60R 2021/0002; B60R 2021/01231; B60R 2021/01302; B60R 2021/23107; B60R 2021/0065; F41A 23/24; F41H 7/04
See application file for complete search history.

(56) References Cited

U.S. PATENT DOCUMENTS 5,190,313 A * 3/1993 Hickling ............... B60R 21/233
244/121
7,494,153 B2 2/2009 Wang
(Continued)

FOREIGN PATENT DOCUMENTS

DE 19932277 A1 1/2001
GB 1278829 A 6/1971
WO 2012/085138 A1 6/2012

OTHER PUBLICATIONS

International Patent Application No. PCT/US2014/016446, International Preliminary Report on Patentability dated Aug. 27, 2015.
(Continued)

*Primary Examiner* — Rodney Butler
*Assistant Examiner* — Frederick Brushaber
(74) *Attorney, Agent, or Firm* — Kilpatrick Townsend & Stockton LLP; Dean W. Russell; James E. Golladay

(57) ABSTRACT

A turret airbag system is provided including a plurality of airbags disposed within the turret to protect an occupant of the turret from injury and/or ejection from the turret. Turret airbags may be configured in padding around a turret access opening, and/or as substantially cylindrical airbags that deploy between the occupant of the turret and a wall or exterior opening of the turret. In some examples, the turret airbag(s) may be integrated with a countermeasure system that deploys explosion countermeasures and activates the
(Continued)

turret airbags based on sensor data and multiple thresholds that indicate a collision event, a rollover event and/or an explosion event.

20 Claims, 9 Drawing Sheets

(51) Int. Cl.
  *B60R 21/13* (2006.01)
  *B60R 21/20* (2011.01)
  *F41H 7/04* (2006.01)
  *B60R 21/00* (2006.01)
  *B60R 21/0132* (2006.01)
  *B60R 21/01* (2006.01)
  *B60R 21/013* (2006.01)

(52) U.S. Cl.
  CPC .............. *B60R 21/20* (2013.01); *F41A 23/24* (2013.01); *F41H 7/04* (2013.01); *B60R 2021/0002* (2013.01); *B60R 2021/0018* (2013.01); *B60R 2021/0065* (2013.01); *B60R 2021/01034* (2013.01); *B60R 2021/01231* (2013.01); *B60R 2021/01302* (2013.01); *B60R 2021/23107* (2013.01)

(56) References Cited

U.S. PATENT DOCUMENTS

| | | | |
|---|---|---|---|
| 8,095,269 B2 | 1/2012 | Pruett et al. | |
| 8,146,993 B2 | 4/2012 | Schneider et al. | |
| 2009/0014991 A1* | 1/2009 | Smyth | B60R 21/13 280/734 |
| 2011/0245994 A1* | 10/2011 | Sloman | F41H 7/02 701/1 |
| 2012/0223551 A1* | 9/2012 | Amante | B64D 11/06 297/216.1 |
| 2012/0239247 A1 | 9/2012 | Eridon | |

OTHER PUBLICATIONS

International Patent Application No. PCT/US2014/016446, Invitation to Pay Additional Fees and, Where Applicable, Protest Fee dated Aug. 28, 2014.

International Patent Application No. PCT/US2014/016446, International Search Report and Written Opinion dated Nov. 28, 2014.

* cited by examiner

| Sensor | Quadrant | CMs |
|---|---|---|
| 1 | 1 | 1,2,3 |
| 2 | 2 | 4,5 |
| 3 | 3 | 8,9,10 |
| 4 | 4 | 6,7 |
| 5 | - | - |
| 6 | - | - |
| 7 | - | - |
| 8 | - | - |

US 9,580,038 B2

TURRET AIR BAGS

CROSS REFERENCE TO RELATED APPLICATIONS

This application is the U.S. national phase entry of International Patent Application No. PCT/US2014/016446, filed Feb. 14, 2014, which application claims priority under 35 USC 119(e) to U.S. Provisional Patent Application No. 61/850,405, filed Feb. 14, 2013, titled "GPK AIRBAG CONCEPT," the contents of the each of which are hereby incorporated by reference in their entireties.

BACKGROUND OF THE INVENTION

The present invention generally relates to systems and methods for providing protection to certain vehicle occupants from disruptions and forces experienced by the vehicle, e.g. vehicle impacts, rollovers, blast waves of a mine, explosive device or other undesired forces, etc. The technology may find applicability, for example, in vehicles with armored turrets, and other vehicles including TenCate's ABDS™ active blast countermeasure system, and similar products.

U.S. Patent Application Publication No. 2012/0239247 by Eridon, the contents of which also are incorporated herein by this reference, purports to disclose "systems and methods for mitigating the effects of sudden accelerative forces on vehicles due to, for example, land mines and improvised explosive devices (IEDs)." See Eridon Application, p. 1, ¶0002. Described generally in the Eridon Application is such a system having sensors, a control system, countermeasures, and a human interface.

U.S. patent application Ser. No. 13/909,295 by Dobriski et al., entitled "ACTIVE COUNTERMEASURES SYSTEMS AND METHODS," the contents of which also are incorporated herein by this reference, provides a more detailed description of systems including multiple components and techniques for creating active countermeasures that are deployable under a wide variety of hostile and other conditions. An exemplary trigger and activation system (TAS) may, for example, comprise any or all of a first responder unit (FRU), a control display assembly (CDA), processors, sensors, and an electronic safe and arm device (ESAD). Together with appropriate countermeasures, the TAS may be used to protect crew members of a vehicle from injury or death caused by, for example, IED or mine blasts or vehicle collisions or rollovers.

One crew member that is particularly vulnerable in vehicle impacts, rollovers, and/or explosive events is the gunner, or other occupant, who is at least partially located in a turret of the vehicle. In many light armored vehicles, a weapons turret may be provided that includes a machine gun or grenade launcher, and that provides at least some protection for the gunner Vehicle turrets may also be used to allow improved visibility for an occupant of an armored vehicle having limited visibility. Such turrets may usually accommodate some portion of the occupant's torso (along with the head) while the lower body remains in the vehicle.

Unfortunately, while usually protected at least partially from incoming small arms fire, the position of the turret occupant makes that person extremely susceptible to injury in vehicle impacts, rollovers, and/or explosive events, e.g. as the unrestrained head and torso of the occupant move violently within the confined space of the turret and/or if the occupant is fully or partially ejected from the turret.

BRIEF SUMMARY OF THE INVENTION

The present subject matter includes systems and methods for providing additional protection to occupants of vehicle turrets, and, in some examples, may be incorporated in systems that are configured to provide a range of countermeasure responses, such as ABDS and other countermeasure systems used in armored vehicles.

According to first aspects of the invention, a turret for a vehicle may include a plurality of airbags arranged around the turret and configured to deploy upon detection of at least one of a rollover event, a collision event and/or an explosive event. In some embodiments, one or more of the airbags may be configured to deploy between an occupant of the turret, such as a gunner, and a wall and/or exterior opening of the turret.

According to further aspects of the invention, a turret for a vehicle may include a first opening configured to allow access to the turret from an interior of the vehicle, a wall at least partially surrounding the first opening, and a plurality of airbags arranged at least partially around the first opening. In some embodiments, the plurality of airbags may be configured to deploy between the first opening and the wall.

In some embodiments, the turret may include a weapon mount, and at least one of the airbags may be configured to deploy between the first opening and the weapon mount.

In some embodiments, the airbags may be included in a padding around the first opening.

In some embodiments, the airbags may be substantially cylindrical when deployed.

In some embodiments, the airbags may be configured to deploy upward.

In some embodiments, the airbags may be included in at least one of the wall or an overhead of the turret.

In some embodiments, airbags may be included in the wall and may be configured to deploy at least partially inward.

In some embodiments, airbags may be included in the overhead of the turret and may be configured to deploy at least partially downward.

In some embodiments, a second opening defining an interface between an inside of the turret and an outside of the turret, wherein at least one of the airbags may be configured to at least partially obstruct the second opening when deployed.

According to further aspects of the invention, method of protecting an occupant in a vehicle turret may include one or more of detecting, by one or more computer processors, at least one of a rollover event or a collision event in the vehicle, and deploying a plurality of airbags at least partially in the vehicle turret.

In some embodiments, the turret may include a first opening configured to allow access to the turret from an interior of the vehicle, and a wall at least partially surrounding the first opening. In some embodiments, the plurality of airbags may be arranged at least partially around the first opening, and deploy between the first opening and the wall.

In some embodiments, the turret may include a weapon mount, and at least one of the airbags may be deployed between the first opening and the weapon mount.

In some embodiments, the airbags may be included in a padding around the first opening, and deploy upward.

In some embodiments, the airbags may be included in at least one of the wall or an overhead of the turret.

In some embodiments, the turret may include a second opening defining an interface between an inside of the turret and an outside of the turret, and at least one of the airbags may be deployed to at least partially obstruct the second opening.

According to further aspects of the invention, a vehicle safety system may include one or more of a first sensor device including a plurality of sensors configured to detect a rollover event, an impact event, and/or an explosive event, a countermeasure, a turret airbag, and a processor in communication with the first sensor device. In some embodiments, the processor may be configured to process signals received from the first sensor device and to selectively initiate at least one of the countermeasure and/or the turret airbag based on results of processing the signals.

In some embodiments, initiating the turret airbag may be based at least in part on the signals exceeding a first threshold, and initiating the countermeasure may be based at least in part on the signals exceeding a second threshold. In some embodiments, the second threshold may be greater than the first threshold. In some embodiments, the second threshold may be, for example, greater than 30 g, or greater than 40 g.

In some embodiments, the processor may be further configured to initiate the turret airbag based on signals received from different sensor packages associated with different areas of the vehicle, and to selectively initiate individual countermeasures in different areas of the vehicle based on signals received from different sensor packages associated with each of the different areas of the vehicle.

In some embodiments, the system may include at least one countermeasure device, e.g. a mass ejector and/or a thruster.

In some embodiments, the processor may be in further communication with a second sensor device that senses a different type of condition than the first sensor device, and the processor may be further configured to process signals received from the second sensor device in determining whether to initiate at least one of the turret airbag or the countermeasure.

In some embodiments, the turret airbag may include a plurality of airbags disposed at least partially around an opening of the turret that is configured to allow access to the turret from an interior of the vehicle.

According to further aspects of the invention, a turret airbag kit may also be provided including the described components to retrofit a vehicle turret to include systems such as those described herein.

According to further aspects of the invention, methods, as well as non-transitory computer-readable storage medium, may also be provided including steps and/or instructions that support turret airbag systems and/or countermeasure systems such as those described herein.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the related technology. No attempt is made to show structural details of technology in more detail than may be necessary for a fundamental understanding of the invention and various ways in which it may be practiced. In the drawings.

DETAILED DESCRIPTION OF THE INVENTION

Figure 1:
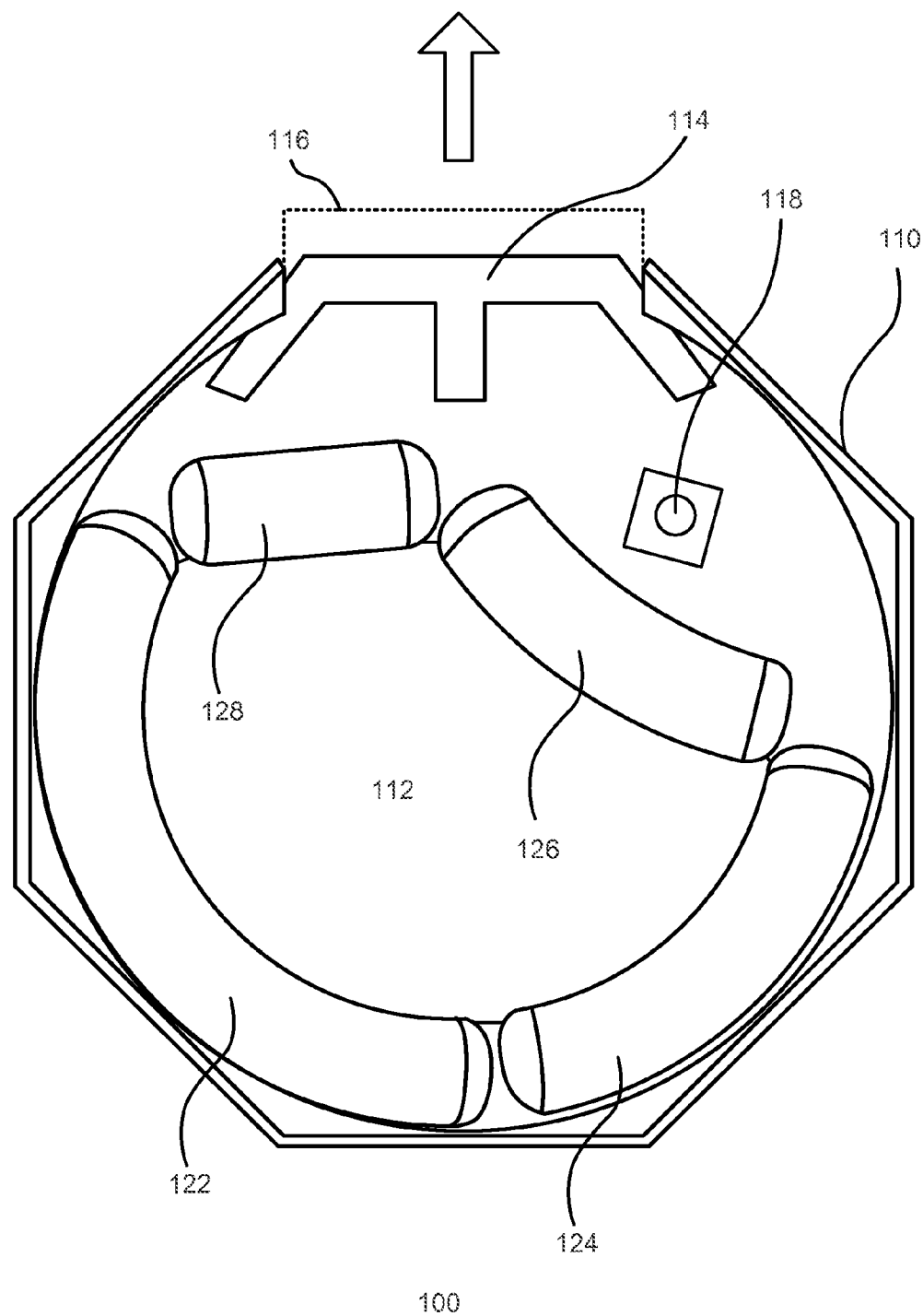
FIG. 1 is a top-down (plan) view of a turret according to certain aspects of the invention.

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise. Thus, for example, a reference to "a sensor" is a reference to one or more sensors and equivalents thereof known to those skilled in the art.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law.

FIG. 1 is a top-down (plan) view showing a first exemplary turret 100 that is configured with an airbag system according to aspects of the invention. As shown in FIG. 1, turret 100 includes a turret wall 110 surrounding an access opening 112 through which a gunner or other occupant can access the turret 100. The opening 112 is sized such that the torso of the occupant can extend from the vehicle below up into the turret 100. In this case, the opening 112 does not form a complete circle and is closed on the right-hand side of the occupant by a platform including turret control 118, which may be used to automatically rotate the turret, or other related functions.

The turret 100 also includes a weapons mount 114, e.g. for a machine gun or grenade launcher. The weapons mount is at least partially disposed in an opening 116 of the turret wall 110.

A plurality of airbags 122, 124, 126 and 128 are disposed in padding around the opening 112. In this instance, the airbags are configured to deploy upward, at least partially between the occupant and the turret wall 110 and weapons mount 114. That way, the occupant standing in the turret through opening 112 may be protected (at least partially) from impact with, for example, the wall 110, mount 114 and/or a weapon (not shown) that is secured in the mount 114. Although each of airbags 122, 124, 126 and 128 are shown as individual units, it is possible for multiple airbags to be included in one padded area, such as including multiple cylindrical airbags, as discussed further below.

Also of note, at least airbags 126 and 128 may be configured to obstruct the occupant from being fully or partially ejected from opening 116. For example, airbags 126 and/or 128 may be configured to deploy between the turret occupant and the opening 116, and/or to fully or partially close opening 116.

Figure 2:
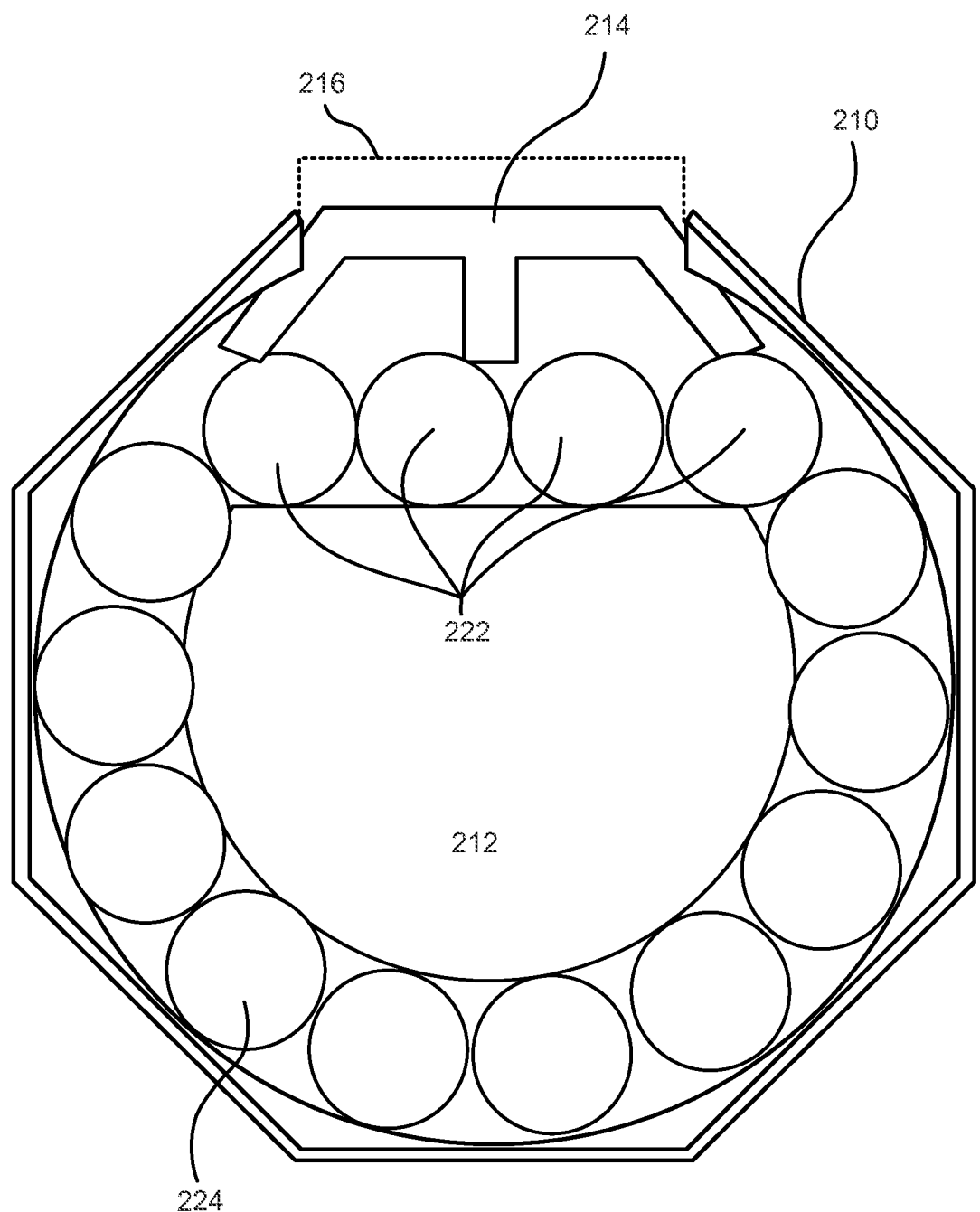
FIG. 2 is a top-down (plan) view of another turret according to certain aspects of the invention.

FIG. 2 is a top-down (plan) view showing a second exemplary turret 200 that is configured with an airbag system according to aspects of the invention. As shown in FIG. 2, turret 200 includes a turret wall 210 surrounding an access opening 212 through which a gunner or other occupant can access the turret 100. The opening 212 is sized such that the torso of the occupant can extend from the vehicle below up into the turret 200. In this case, the opening 212 does not form a complete circle and is closed toward the front of the turret by a platform including air bags 222.

The turret 200 also includes a weapons mount 214, e.g. for a machine gun or grenade launcher. The weapons mount is at least partially disposed in an opening 216 of the turret wall 210.

In addition to the airbags 222, plurality of airbags 224 are disposed around the opening 212. In this instance, the airbags are substantially cylindrical, and are configured to deploy upward, at least partially between the occupant and the turret wall 210 and weapons mount 214. As with turret 100 shown in FIG. 1, the occupant standing in the turret through opening 212 may be protected (at least partially) from impact with, for example, the wall 210, mount 214 and/or a weapon (not shown) that is secured in the mount 214. Although each of airbags 222 and 224 are shown as individual units, it is possible for multiple airbags to be included in one padded area, such as shown in FIG. 1.

Also of note, at least airbags 222 may be configured to obstruct the occupant from being fully or partially ejected from opening 216. For example, airbags 222 may be configured to deploy between the turret occupant and the opening 216, and/or to fully or partially close opening 216.

Figure 3:
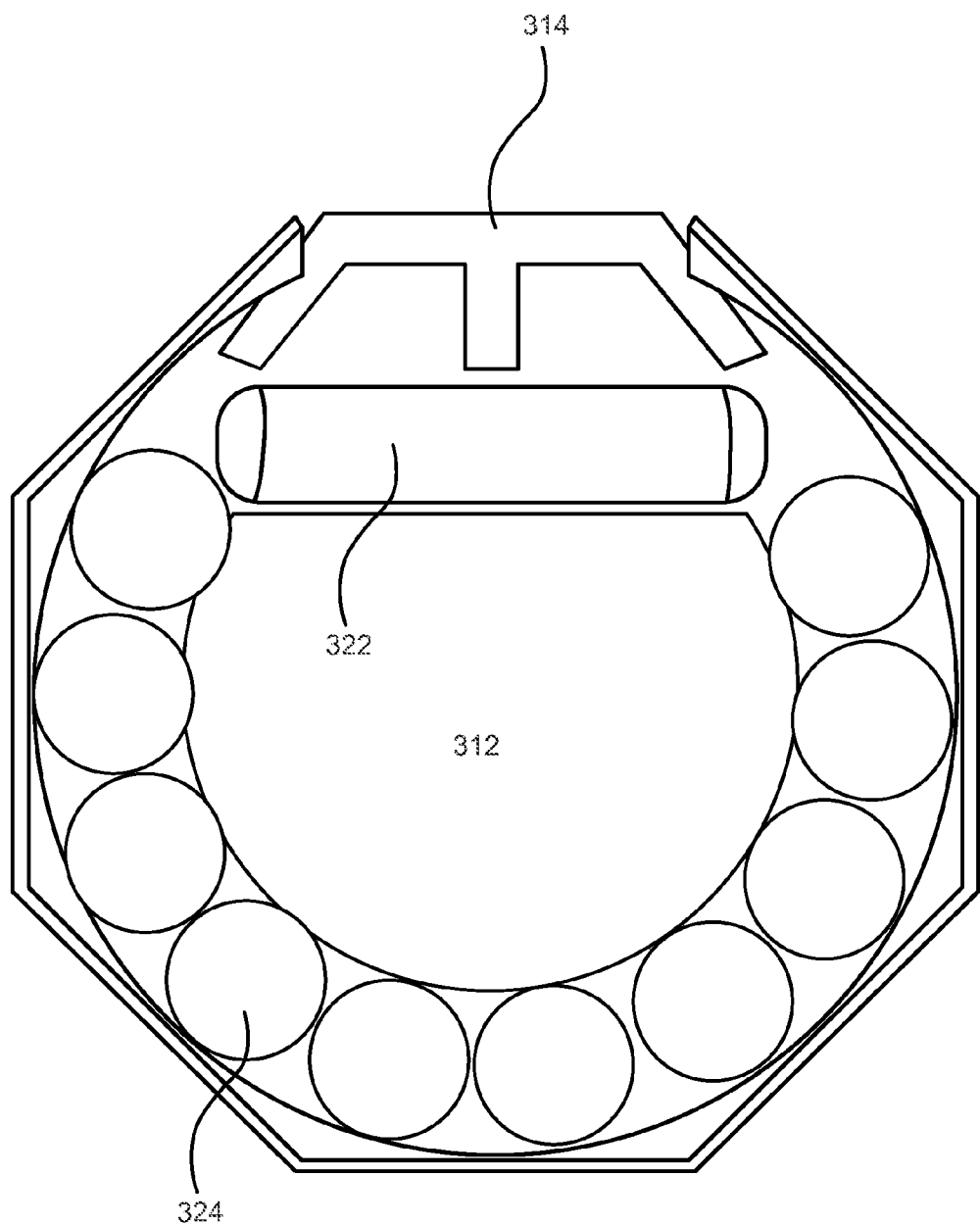
FIG. 3 is a top-down (plan) view of another turret according to certain aspects of the invention.

FIG. 3 is a top-down (plan) view showing a third exemplary turret 300 that is configured with an airbag system according to aspects of the invention. As shown in FIG. 3, turret 300 is similar to the turrets 100 and 200 shown in FIGS. 1 and 2, and includes a turret wall surrounding an access opening 312 through which a gunner or other occupant can access the turret 300. In this case, the turret includes a combination of an elongated airbag 322, and a plurality of cylindrical airbags 324 are disposed around the opening 312. The airbags 322 and 324 are configured to deploy upward, at least partially between the occupant and the turret wall and weapons mount 314.

Also of note, at least airbag 322 may be configured to obstruct the occupant from being fully or partially ejected from an opening of the turret 300 such as an overhead opening and/or weapons opening of the turret. For example, airbag 322 may be configured to deploy between the turret occupant and the opening, and/or to fully or partially close an opening.

It is noted that, with respect to the various configurations depicted in FIGS. 1-3, any of the airbags may be mounted and/or disposed in a turret wall and configured to deploy at least partially inward with respect to the turret and/or mounted and/or disposed in a turret overhead (roof) and configured to deploy at least partially downward with respect to the turret.

Figure 4:
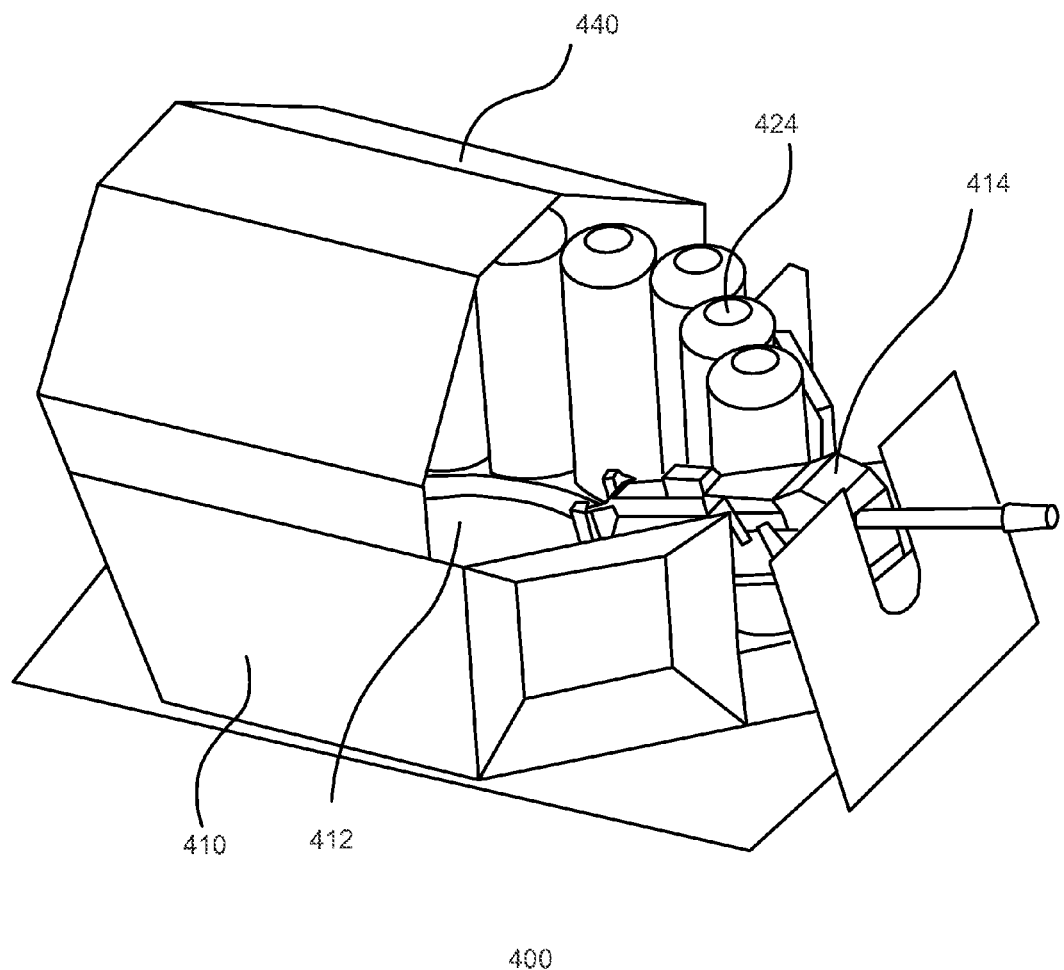
FIG. 4 is an isometric view of another turret with at least some of the turret airbags deployed according to certain aspects of the invention.

FIG. 4 is an isometric view showing a fourth exemplary turret 400 that is configured with an airbag system according to aspects of the invention. As shown in FIG. 4, turret 400 includes a turret wall 412 partially surrounding an access opening 412 through which a gunner or other occupant can access the turret 400. In this case, the turret includes an overhead 440, and the combination of the turret wall 410 and overhead 440 substantially define another opening, from the inside of the turret to an outside of the turret. Other openings are also possible, of course, and may include, for example, windows, hatches, weapons ports, etc.

A plurality of cylindrical airbags 424 are shown in a deployed configuration, disposed around the opening 412. Only the airbags on the left-hand side of the turret are shown as deployed, for ease of understanding and viewing. The airbags 424 are configured to deploy upward, at least partially between the occupant and the turret wall 410.

Also of note, airbags 424 are configured to obstruct the occupant from being fully or partially ejected from the opening of the turret 400 above the weapon 414. In this case, at least some of the airbags 424 are configured to deploy between the turret occupant and the opening, and to partially close the opening.

One or more additional airbags may be mounted and/or disposed in the turret wall 410 and/or overhead 440, and may be configured to deploy at least partially inward and/or downward with respect to the turret, and/or to partially close the opening at the front of the turret.

Figure 5:
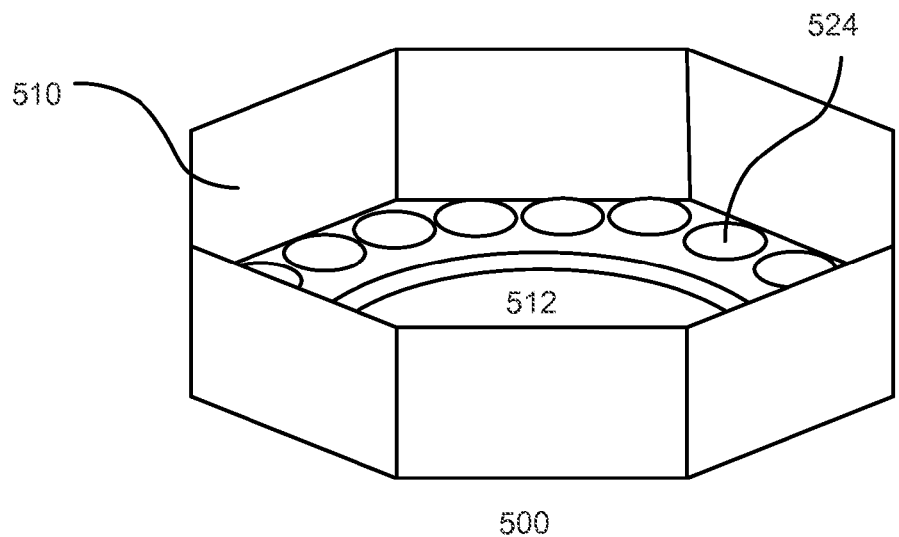
FIG. 5 is an isometric view of another turret according to certain aspects of the invention.
Figure 6:
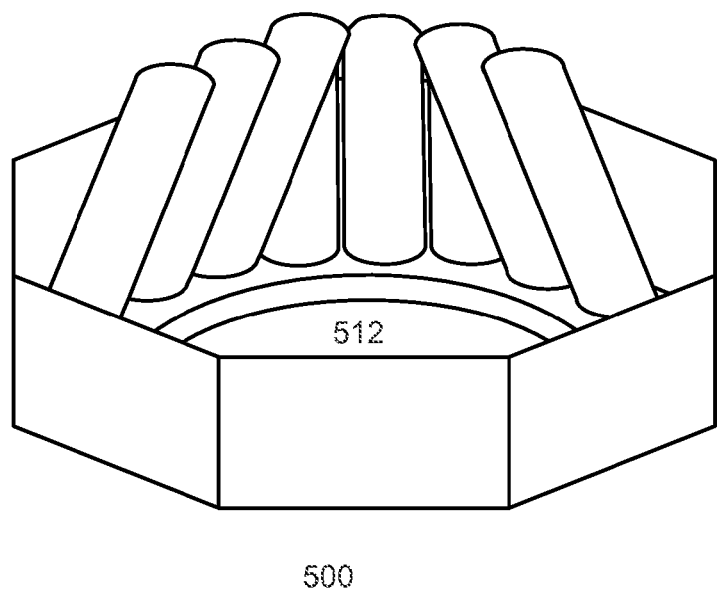
FIG. 6 is an isometric view of the turret shown in FIG. 5, with at least some of the turret airbags deployed, according to certain aspects of the invention.

FIGS. 5 and 6 show additional details of an exemplary airbag configuration that may be used to help prevent an occupant from being injured and/or ejected from a turret.

FIG. 5 is an isometric view showing another exemplary turret 500 that is configured with an airbag system according to aspects of the invention. As shown in FIG. 5, turret 500 includes a turret wall 510 surrounding an access opening 512 through which a gunner or other occupant can access the turret 500. The turret walls 510 define another opening that may be considered as an interface between an "inside" of the turret and an outside of the turret. That is, the area surrounded by the turret walls 510 is inside, and the top of the turret is open to the outside. Although shown without an overhead, in some examples, it is also possible for a turret like 500 to be fully or partially covered.

In this case, the turret 500 includes a plurality of cylindrical airbags 524 disposed around the opening 512. The airbags 524 are configured to deploy upward and inward with respect to the turret, as shown in FIG. 6.

FIG. 6 is an isometric view showing another configuration of exemplary turret 500, with at least some of the airbags 524 deployed upward and inward with respect to the turret 500. As shown in FIG. 6, airbags 524 be configured to obstruct the occupant from being fully or partially ejected from the top opening of the turret 500, e.g. by partially or fully obstructing the top opening.

Turret airbag components, such as those described above, and/or sensors and control systems, such as those discussed further below, may be combined in kits that can be used to retrofit existing turreted vehicles to improve the safety of turret occupants. For example, a turret airbag retrofit kit can include padding units that are similarly sized and shaped to existing turret padding elements, but include integrated airbags and electrical connectors for connecting the airbags to a control system.

As noted previously, turret airbag systems, such as shown in FIGS. 1-6, may be incorporated and/or integrated with ABDS or other countermeasure systems used to protect armored vehicles and the like. In such systems, certain sensor and/or processors may be configured to initiate deployment of the turret airbags under certain conditions and to initiate deployment of other protective measures under other conditions. For example, in certain collision events it may be helpful to deploy turret airbags to protect the turret occupant, but not to initiate dynamic countermeasures that are designed to reduce the damage and/or injury from an explosive event such as an IED or rocket attack. According to aspects of the invention, a countermeasure system may use similar and/or dissimilar sensors to distinguish between different types of events (e.g. collision, rollover and explosive events) and initiate appropriate safety devices, such as turret airbags, and/or countermeasures, such as mass ejectors and/or thrusters.

Figures 7A, 7B:
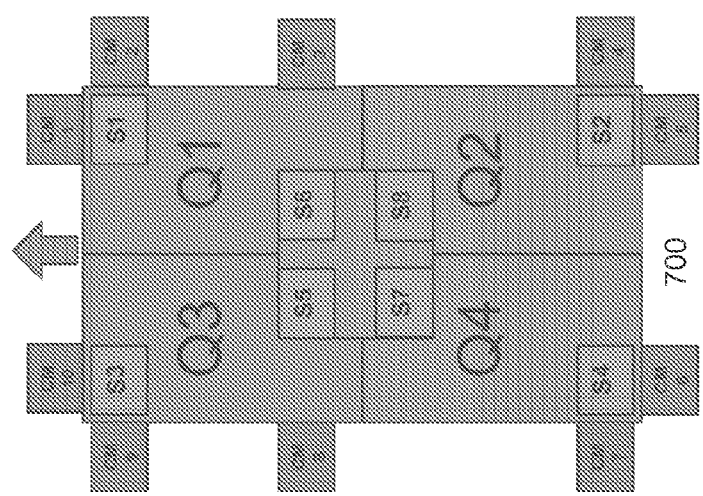
FIG. 7A is a simplified schematic diagram showing a plurality of sensor packages and countermeasures disposed in a vehicle according to aspects of the invention.
FIG. 7B is a chart showing correspondence between the sensor packages and countermeasures shown in FIG. 7A.

FIG. 7A shows an exemplary arrangement of sensor packages (S1-S8) disposed in different parts of a vehicle 700. In the embodiment shown in FIG. 7A, each "quadrant" (Q1-Q4) includes at least one sensor package (e.g. S1-S4, respectively) and may include one or more sensor packages (e.g. S5-S8). In some embodiments, sensor packages S5-S8 may be replaced by a single sensor package, which may be placed, for example, in an approximate center of the vehicle, or other location. The placement of sensor package S1-S8 may vary, for example, based on specific weight distributions of the vehicle, rigidity distributions, wheelbase dimensions, and other factors that may affect the responsiveness of the vehicle to an explosion, collision and/or dynamic driving incident.

As also shown in FIG. 7A, each vehicle quadrant may include one or more explosion countermeasures (CM1-CM10). As described further herein, one or more of the countermeasures may be associated with a quadrant and/or sensor package(s) such that selective activation of appropriate countermeasures may be made based on the acceleration data from specific sensor packages. In the embodiment shown in FIG. 7A, countermeasures CM1 and CM10 are disposed in proximity to the front corners of the vehicle 700, countermeasures CM5 and CM6 are disposed in proximity to the rear corners of the vehicle 700, countermeasures CM2 and CM4 are disposed in proximity to the right side corners of the vehicle 700, countermeasures CM7 and CM9 are disposed in proximity to the left side corners of the vehicle 700, and countermeasures CM3 and CM8 are disposed in a mid-portion on either side of the vehicle 700 (in this case forward of center). In embodiments, exemplary systems may include various numbers of sensor packages, e.g. five or more sensor packages, six sensor packages, seven sensor packages, eight sensor packages, etc. In embodiments, exemplary systems may include various numbers of countermeasures, e.g. four or more countermeasures, eight or more countermeasures, twelve or more countermeasures, sixteen or more countermeasures, etc.

In some examples, any of sensor packages (S1-S8) may also be used to suggest initiation of a turret airbag as described herein. In some instances, the turret airbags may be initiated without initiating any of countermeasures CM1-CM10, whereas in other instances, an initiation of any of countermeasures CM1-CM10 may also initiate the turret airbag(s).

FIG. 7B shows a firing correspondence between the sensor packages S1-S8, the quadrants Q1-Q4 and the countermeasures CM1-CM10. As can be seen in FIG. 7B, the front quadrants Q1 & Q3, include three countermeasures each (i.e. CM1-CM3 and CM8-CM10, respectively). Therefore, confirmation of a firing event for sensor package S1 (along with any necessary confirmation from other sensor packages), may result in CM1-CM3 activating, without activating CM4-CM10. Sensor packages S5-S8 may not be specifically associated with individual countermeasures and may be used, for example, to confirm firing events detected by other sensor packages, activate additional arm locations, and/or other data collection. It should be understood that the exemplary arrangements shown in FIG. 7A, and related correspondences shown in FIG. 7B, may be altered, e.g. by including different numbers of sensor packages, different numbers of countermeasures, different locations, and/or different relationships, without departing form the overall concepts of the invention.

Figure 8:
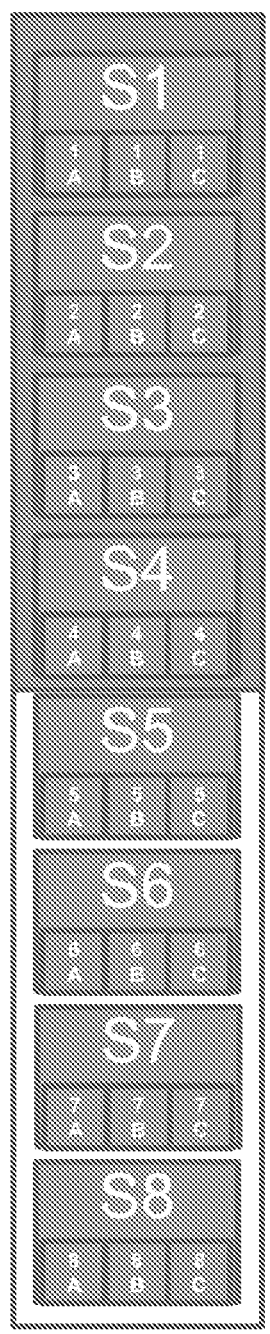
FIG. 8 is a block diagram with further details of accelerometers included in the sensor packages shown in FIG. 7A.

FIG. 8 shows additional details of sensor arrangements that may be included, for example, in the sensor packages S1-S8, shown in FIG. 7A. As shown in FIG. 8, the eight sensor packages S1-S8 may each include a plurality of (for example, three) accelerometer chips, labeled 1A-1C, 2A-2C, etc. In embodiments, each accelerometer chip in a sensor package may be oriented, or otherwise configured, to detect acceleration in the same direction, e.g. in a vertical direction with respect to the vehicle. Having multiple accelerometers in each sensor package, oriented in the same direction, may provide advantages in improving the reliability of each sensor package by having redundancy for "voting," as well as allowing the sensor packages to continue to reliably function in harsh conditions, e.g. where individual sensor chips may fail due to environmental or other conditions.

The accelerometers may be configured to detect vertical acceleration of the vehicle, e.g. by orienting the accelerometers to detect vertical acceleration, horizontal or lateral acceleration, and/or rollover events, e.g. by orientation of the vehicle. In embodiments, the sensors may also be used to initiate making ready a safe and arming device, and/or to initiate an explosion countermeasure based on the determination that an explosion has occurred.

In determining whether to activate explosion countermeasures, it may be desirable to ensure that the vehicle is actually being subjected to an explosion, as opposed to a collision or other active-driving event. In some embodiments, a SUM of sequential data points, e.g. in a buffer, may be evaluated to determine whether the SUM exceeds a predetermined threshold to confirm that an explosion is occurring. For example, a set number (e.g. 4, 5, 6, etc.) of sequential data points in a 10 point buffer may be summed for one or more accelerometers, and if the SUM is greater than or equal to a predetermined threshold (e.g. >=300 or similar value such as 200, 250, 350, 400, etc.), a safe and arming device may be made ready, additional acceleration data may be considered and/or an explosion countermeasure may be activated. On the other hand, deploying the turret airbags may be determined by meeting a lower threshold than that used for the explosion countermeasures.

In some embodiments, it may be desirable to assess whether the readings (e.g. absolute value and/or SUM) from multiple accelerometers in a specific sensor package exceed the predetermined threshold. For example, the system may be configured to make ready a safe and arming device, consider additional acceleration data, activate an explosion countermeasure, or initiate a turret airbag, based on a determination that at least two accelerometers of a sensor package have exceeded an absolute g, or have exceeded a SUM of data points. Such safeguards may be desirable, for example, in order to avoid potentially erroneous countermeasure firings.

Similarly, in some embodiments confirmation from at least two different sensor packages may be required, e.g. an absolute value and/or SUM of sequential data points in the buffer corresponding to another sensor package may be evaluated for confirmation of a firing event. For ease of description, a first sensor package that is determined to exceed a threshold may be referred to as a "primary" sensor, and a second sensor package that is determined to exceed a threshold may be referred to as a "secondary" sensor (even though the sensors may be functionally equivalent). For example, the system may be configured such that, after a first threshold is exceeded with respect to a primary package, at least one other secondary package is evaluated to determine whether a second threshold has been exceeded. It should be noted that the first and second thresholds in this example may be the same, or different, values.

In some embodiments, the multiple sensor packages used to confirm a firing or other event may be differentiated such that specific sensor packages require confirmation from other pre-designated sensor packages. This may be advantageous for a number of reasons. For example, certain sensor packages may be attached to parts of the vehicle that might be blown off in an explosion (e.g. sensor packages mounted to the periphery of the vehicle). Therefore, sensor packages disposed on the periphery of the vehicle (e.g. S1-S4 shown in FIG. 7A), may be associated with one or more sensor packages disposed toward the middle of the vehicle (e.g. S5-S8 shown in FIG. 7A) for firing event confirmation. In the embodiment shown in FIG. 7A, S1 may be associated with S6, S2 may be associate with S8, S3 may be associate with S5, and S4 may be associate with S7. However, other configurations are also possible, such as associating all of the peripheral sensor packages with one centrally mounted sensor package, and/or creating dynamic associations in order to tailor the necessary countermeasure response.

In embodiments, the confirmation threshold for the secondary sensor package may be the same as, or different from, the initial threshold for the primary sensor package. For example, as mentioned above, an initial threshold for the primary sensor package may be set such that a SUM of greater than, or equal to, 300 for each of two or more of the accelerometers in the primary sensor package is required. A confirmation threshold for the secondary sensor package may be set such that a SUM of greater than, or equal to, 150 for each of two or more of the accelerometers in the secondary sensor package is required.

In embodiments, determining whether the confirmation threshold is exceeded may be based on a sum of values for a particular sensor package included in a buffer. In embodiments, the sum of values may be, for example, from about a 3 ms window in the buffer. In embodiments, the processor may be configured to initiate a countermeasure within about 10 ms, or less than 15 ms, of the initial acceleration of the primary sensor exceeding the first threshold.

As noted previously, in some examples, the initiation of an explosion countermeasure may also initiate a turret airbag, considering that the determination that an explosion has occurred may need to be made more quickly than a collision determination, and will typically involve significantly higher accelerations.

An example of an acceleration plot, which may trigger a firing event, may include an initial shock peaking, for example, over 140 g detected by multiple accelerometers. In embodiments, an absolute g threshold for countermeasure activation may be set to, for example, greater than 30 g, greater than 40 g, greater than 100 g, in a range of about 25 g to 200 g, in a range of about 40 g to 60 g, or about 50 g. As described further herein, such rapid and extreme acceleration changes may be used as an initial indicator that an explosion may have occurred, to make ready a safe and arming device, and/or to confirm that an explosion has occurred. Some of the factors that may be used in designing algorithms and making determinations according to aspects of the invention, are as follows.

Sum (or SUM) may be used to require a change in velocity for the system to fire. Units are, for example, G*0.5 ms, so multiply by 9.81 m/s$^2$/2000 s to get into m/s i.e. sum 300 ~1.5 m/s delta V. One sensor may be required to have a change in velocity of ~1.5 m/s, and a second sensor may be required to have a change in velocity of ~0.75 m/s.

Window length may be used, e.g. sum is calculated over a predetermined window (3 ms is 6 data points per accelerometer in some embodiments). This may be used to limit drift, and require the change in velocity to be fast enough to reach the sum criteria within this window. Indicates a quick impulse blast event vs. drop event.

In some examples, if any of the accelerometers satisfy the criteria of greater than or equal to |50| g, then an ARM signal may be sent to one or more safe and arming devices to make them ready. In embodiments, redundancy may not be required to make the determination to make ready the safe and arming device(s), in order to, for example, accelerate the overall processing timeline. In embodiments, this may also cause the system to make further evaluations, e.g. by looking at additional acceleration data during a window to determine whether an explosion has occurred and/or whether to initiate an explosion countermeasure or other action.

In some examples, acceleration data may be evaluated and/or compared to various thresholds, e.g. to determine whether two or more accelerometers of a sensor package have a SUM value (e.g. for 6 contiguous samples out of the 10 stored in the buffer) greater than or equal to one or more thresholds, e.g. 150 and 300 for an explosion event. For example, one or more processors may be configured to determine that at least two sensor packages satisfy the lesser criteria before proceeding to evaluate one or more of the qualifying sensor packages satisfy another criteria. Such processing may be advantageous, for example, in rapidly processing the acceleration data in order to activate necessary countermeasures in under 10 ms. That is, two or more sensors may be determined to satisfy the lesser criteria prior to any sensor satisfying the higher criteria. Therefore, as soon as the lower criteria is satisfied, the processing may proceed, without having to go back and confirm the lesser criteria. Aspects of the foregoing are also shown in the state machine diagram included in FIG. 9.

The process flow 900 may begin with a POWER ON state 910. The process may proceed with a self test state 912 that may be required to ensure the countermeasure system is fully functional, that a required number of accelerometers are functional, that acceleration values in the buffer are zeroed out, etc. Once the self test is passed, the processing may continue with state 914.

In state 914, the buffer values may be evaluated to determine whether any values exceed the threshold for making ready the safe and arming device(s). The processing may continue to monitor the buffer for this criteria until it is satisfied, or until the system is powered off. If the threshold for making ready the safe and arming device(s) is exceeded, the processing may continue with state 916.

In state 916, an ARM signal may be sent to make ready the safe and arming device(s), and the buffer values may be further evaluated to determine whether any values in the buffer still exceed the threshold for making ready the safe and arming device(s). In the event that no buffer values exceed the threshold for making ready the safe and arming device(s), the processing may return to state 914, in which the safe and arming devices are made safe again.

In state 916, the buffer values may also be further evaluated to determine whether values in the buffer satisfy the requirement(s) to activate an explosion countermeasure. This may include, for example, comparing absolute g values, and/or SUM values, for one or more accelerometers in one or more sensor packages. In one embodiment, state 916 may include evaluating the values to determine whether an absolute g value (e.g. 50 g, 75 g, 100 g, 125 g, 150 g, 175 g, 200 g, etc.) has been exceeded for two or more sensors of a sensor package. In other embodiments, a SUM for each of at least two accelerometers in one sensor package may be evaluated to determine whether each SUM exceeds a first threshold, e.g. greater than or equal to 100, 150, 200, 250, 300, 350, 400, etc.

In state 918, the determination to activate an explosion countermeasure may be made. In embodiments, this may be based on an evaluation made in state 916, and/or may include additional processing. For example, state 918 may include an additional comparing of absolute g values, and/or SUM values, for one or more accelerometers in one or more sensor packages. In one embodiment, state 918 may include evaluating the values to determine whether an absolute g value (e.g. 50 g, 75 g, 100 g, 125 g, 150 g, 175 g, 200 g, etc.) has been exceeded for two or more sensors of a sensor package (other than that of state 916). In other embodiments, a SUM for each of at least two accelerometers in one sensor package (other than that of state 916) may be evaluated to determine whether each SUM exceeds a threshold, e.g. greater than or equal to 100, 150, 200, 250, 300, 350, 400, etc. (which may be the same, or different than, a threshold applied in state 916). In one embodiment, the threshold applied in state 918 is greater than the threshold applied in state 916. In another embodiment, the threshold applied in state 918 is less than the threshold applied in state 916.

Once a decision to activate an explosion countermeasure is made in state 918, a FIRE command signal may be sent to one or more countermeasures and the turret airbag depending on, for example, the sensor packages meeting the selected criteria, and quadrant correspondence of sensor packages and/or countermeasures. It should be noted that, according to certain embodiments, the processing between states 914 and 918, i.e. between detecting a value that justifies making ready the safe and arming device, and activating an explosion countermeasure, may be accomplished in 10 ms or less.

Processing may further include making safe any unfired quadrants by returning to state 916, evaluating the buffer to determine whether any values still exceed the threshold for making ready the safe and arming device(s), and returning to state 914 when no values are found that exceed the threshold for making ready the safe and arming device(s).

It is noted that, even if state 918 does not lead to firing a countermeasure, the state machine may still initiate a turret airbag. This may be determined, for example, based on the initial threshold determination leading to state 918 or a separate threshold determination in state 918, lower than the threshold used for firing a countermeasure.

Figure 9:
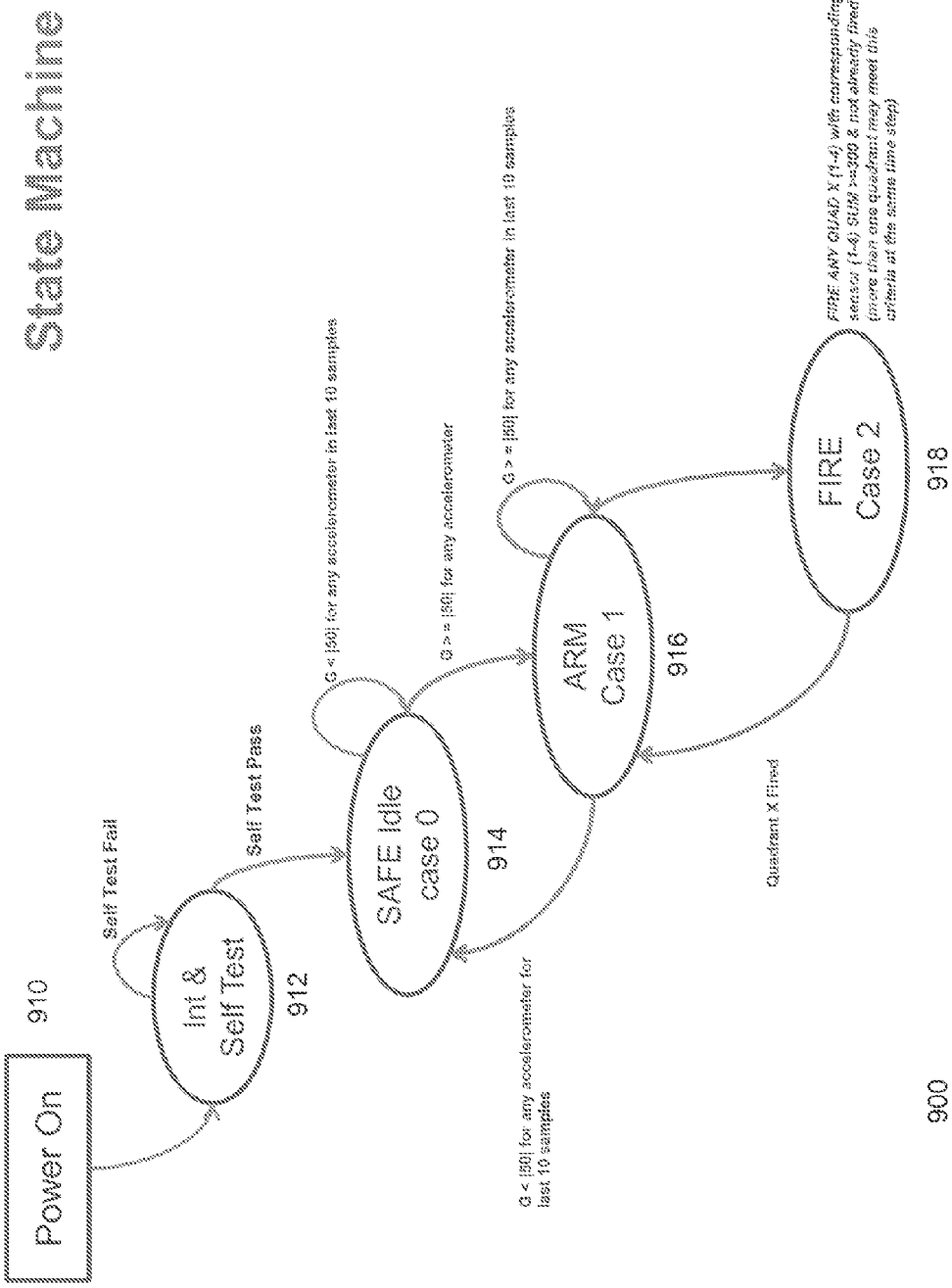
FIG. 9 is a state machine diagram showing exemplary machine states according to aspects of the invention.

Exemplary systems may also use a state machine, similar to that shown in FIG. 9, to make ready and initiate a turret airbag, e.g. using one or more lower thresholds for initiating the airbag. In some examples, this need not involve a safe and arming device as in state 914, or include separate arming and firing determinations as shown in states 916 and 918.

As described above, exemplary systems and methods may use multiple sensor packages, each containing multiple accelerometers. It should be further understood that sensing systems and algorithm described herein can be configured to function through individual sensor data drop-outs. For example, exemplary systems may be configured such that data interruption from any one of the available sensor packages (e.g. S1-S4 and/or S5-S8) will not preclude determining that an explosion or other event has occurred based on data received from the remaining sensors. Embodiments may include allowing the system to adjust the sensor packages associated with one another in the event that there is a data drop-out from one or more of the sensor packages. For example, referring back to FIG. 7A, if sensor package S1 is associated with sensor package S6, and sensor package S6 experiences a data drop-out, then the system may look to one or more of sensor packages S5, S7, S8 to confirm a firing event for S1. Additionally, exemplary systems may be configured such that data interruption from any one of the accelerometers within a sensor package (e.g. 1A, 1B, 1C) will not preclude determining that an explosion or other event has occurred based on data received from the remaining accelerometers.

In some embodiments, thresholds for activating turret airbags (without explosion countermeasures) may be set, for example, in a range of 2-10 g, 4-10 g or 4-20 g. According to aspects of the invention, forces that are significantly greater may be used for countermeasure activation, e.g. greater than 30 g, greater than 40 g, in a range of about 30 g to 60 g, in a range of about 40 g to 60 g, or about 50 g. Such ranges may be advantageous, for example, for use in military vehicles that may experience collision-like shocks on a routine basis, avoiding sensor saturation and/or damage due to extreme forces resulting from an explosive blast, as well as ensuring that active blast countermeasures are only deployed as a result of an explosive blast and not a vehicle collision.

According to further aspects of the invention, the present subject matter may provide an effective active blast countermeasure system using processing techniques and/or times, and countermeasure deployment procedures and/or times, that are significantly different from other systems used, for example, in automotive airbag systems alone. For example, WO/2000/040438, published Nov. 30, 2000 and entitled "AIRBAG ACTUATION EVENT DISCRIMINATION SYSTEM AND METHOD," describes the advantages of inhibiting the deployment signal for airbags during a predetermined time period following detection of a sensor signal that exceeds a first threshold, and ceasing inhibition of the deployment signal after the predetermined time period has expired. In this regard, WO/2000/040438 states that car airbag systems may rely on lateral acceleration and may employ delays to avoid unnecessary deployments, e.g. of a period of about 7.5 ms. As described therein, calculation of the deployment algorithm begins at around 10 ms, and the deployment decision of the side airbags is inhibited, e.g. for 7.5 ms, such that the deployment decision is inhibited from 10 ms through 17.5 ms. Thus, the deployment signals are not sent until around 17.5 ms. On the contrary, according to aspects of the invention, processing, making ready a safe and arming device, and activating airbags and/or blast countermeasures may be accomplished, for example, in 10 ms or less, or 15 ms or less. In some examples, a rollover or collision event may cause initiation of a turret airbag within a first time period, whereas an explosive event may cause initiation of countermeasures and turret airbags within a second time period that is less than (e.g. less than ½ of) the first time period. Such differences may be advantageous, for example, for countering otherwise catastrophic explosive blasts, in ways that typical airbag systems would not be able to, or would be effectively prevented from providing.

Figure 10:
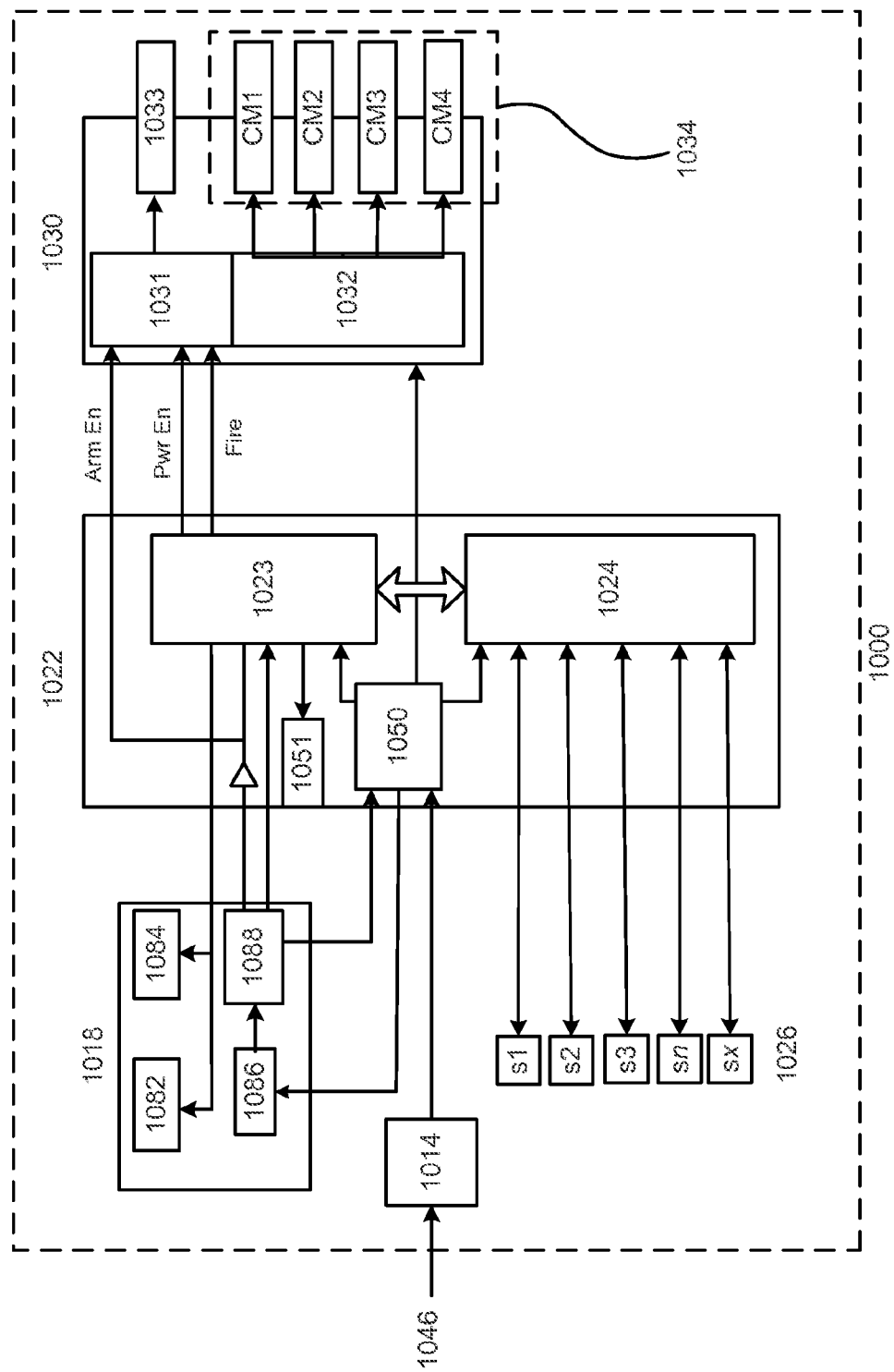
FIG. 10 is a schematic block diagram of aspects of an exemplary TAS consistent with the present invention.

Depicted in FIG. 10 is a block diagram of an exemplary trigger and activation system (TAS) 1000 of the present invention. TAS 1000 may include first responder unit (FRU) 1014, control display assembly (CDA) 1018, processor 1022, one or more sensors 1026, electronic safe and arm device (ESAD) 1030, one or more turret airbag 1033, and one or more countermeasures 1034. Although conceivably useful wherever force-related countermeasures are desirably deployed, as to prevent vehicle rollover, for example, TAS 1000 is especially designed for use in connection with a vehicle operating in a theatre in which IEDs, mines, or other explosive devices may be present.

A processor 1022 (which may be configured in various ways described herein), may include, for example, a microcontroller 1023 connected via a bus to interface system (IC) 1024, power conditioner 1050, data recorder 1051, and various other electronic storage, and/or communication means known by those of skill in the art. IC 1024 may be connected to a plurality of sensors 1026, including acceleration sensor packages S1-S4, as well as various other sensor types (sx), which may include, for example, cameras, light sensors, radiation sensors, deformation sensors, heat sensors, pressure sensors, contact sensors, proximity sensors, strain sensors, and force sensors.

In embodiments, the processor 1022 may be in communication with other sensor types (sx) that sense a different type of condition than the acceleration sensors, and the processor 1022 may be configured to process signals received from the other sensor devices in determining whether to initiate a countermeasure and/or a turret airbag. For example, when the other sensor types (sx), include cameras, light sensors, radiation sensors, deformation sensors, heat sensors, pressure sensors, contact sensors, proximity sensors, strain sensors, and/or force sensors, one or more of change in light patterns, detected light, radiation, pressure, temperature, contact, proximity, strain and/or force may be required as a confirmation threshold that further informs the decision making process on whether an explosion has occurred, and/or whether to activate a countermeasure. However, it should be noted that the inventors have found that an acceleration sensor-only system has certain advantages in sensor robustness, ease of integration on a vehicle, as well as speed and accuracy in making such determinations.

ESAD 1030 may include various components including, for example, controller 1031 including hardware and/or software for processing signals including Arm, Power and Fire instructions received from the processor 1022. Controller 1031 may communicate with turret airbag 1033, e.g. for diagnostics, arm commands, fire commands, etc. ESAD 1030 may further include a safety 1032 through which firing signals to any of countermeasures 1034 must pass. In some examples, signals to turret airbag 1033 may also pass through safety 1032, but this is not always necessary. Controller 1031 may be configured to power on, or otherwise make ready, safety 1032 such that Fire instructions received from the processor 1022 are communicated, e.g. by electrical current sufficient to activate an initiator, to appropriate countermeasures 1034.

The ESAD 1030 may function to arm and/or initiate turret airbag 1033 and/or countermeasures 1034 upon command of processor 1022. Like various other aspects of the inventive systems, the ESAD 1030 preferably "fails safe"—i.e. if it is non-functional, it enters or reverts to a mode in which countermeasures 1034 cannot activate. Fuze cord or any other suitable material may connect the ESAD 1030 to the countermeasures 1034. In embodiments, the ESAD 1030, or other safe and arming device, may be collocated with the countermeasure, e.g. in a countermeasure cartridge.

With TAS 1000 in the "arm enable" mode, processor 1022 controls deployment of countermeasures 1034. Processor 1022 directly or indirectly receives signals from sensors 1026 (e.g. via IC 1024 and any busses) and determines (1) if making ready ESAD 1030 is appropriate, and (2) if deployment of any countermeasure 1034 or turret airbag 1033 is appropriate. If making ready and/or deployment is appropriate, as described further herein, processor 1022 signals ESAD 1030 accordingly. In some versions of the invention, processor 1022 may be housed in an enclosure having deformable brackets so as to allow dampening of shocks otherwise likely experienced by the processor 1022.

FRU 1014 may include, for example, a switch interposed in the main power supply line 1046 of the vehicle between a vehicle power supply (e.g. a battery or electrical generator) and ESAD 1030 to which countermeasures 1034 are connected. If the switch in FRU 1014 is open, electricity is not available for ESAD 1030 to arm the countermeasures 1034 for deployment.

In embodiments, various parts of the TAS may be connected to and/or include an auxiliary power source, in addition to the main power supply line 1046 of the vehicle. For example, power conditioner 1050 may be connected to and/or include an auxiliary power source sufficient to power essential parts of the TAS 1000 for a period of time sufficient to deploy countermeasures and/or airbags if the vehicle experiences an IED blast that disrupts power from main power supply line 1046. The auxiliary power source may be, for example, a capacitor (e.g. a 27,000 uF super capacitor) that allows the system to function for at least 100 ms after battery power is lost. This can assure a functioning system even if the battery power is lost from the IED blast.

As noted in FIG. 10, CDA 1018 beneficially may, but need not necessarily, include a system status indicator 1082, a safety status indicator 1084, a power indicator 1086, and an armed power control indicator 1088. CDA 1018 additionally advantageously may be powered by power supply 1046 (albeit perhaps after the power undergoes conditioning by power conditioner 1050), although other sources of electricity possibly may be used instead. Outputs of CDA 1018 may be connected electrically to (at least) processor 1022.

According to aspects of the invention, the processes described herein may be advantageously employed to activate explosion countermeasures, some examples of which are described below.

Countermeasures themselves may be of varying types yet remain consistent with the present invention. Advantageously, however, countermeasures may include cartridges into which ejectable masses and charges are loaded. Currently preferred ejectable masses are predominantly solids (as opposed to liquids or gases), with preferred solids either being disintegrable or comprising multiplicities of disintegrated particles. If so, the likelihood of serious injury to a bystander impacted by a portion of the ejected mass may be reduced.

Cartridge countermeasures may be placed in barrels mounted to or otherwise connected or attached to vehicles. The barrels may be constructed in sets or individually as desired and configured to receive cartridges in any manner allowing initiation of the propellant. In some versions of the invention, banks of barrels are mounted at the four corners of the roof of a vehicle. Alternatively or additionally, barrels may be mounted on vehicle sides, fronts, or rears. Presently preferred in some versions is that barrels not be placed on the vehicle undercarriage, although such placement could occur in other versions. Because the cartridges are separate from the barrels, the cartridges may be transported apart from the barrels and loaded only when needed, further reducing risk of undesired countermeasure deployment.

In some embodiments, a computer-readable medium containing computer-readable instructions recorded thereon is provided. For example, one or more memory devices (included in, or in communication with, processor 1022 shown in FIG. 10) may store an application or computer program product accessible from a computer-usable or computer-readable medium providing program code for use by or in connection with processor 1022 or any instruction execution system. For the purposes of this description, a computer-usable or computer-readable medium may include any tangible medium or apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks may include compact disc read-only memory (CD-ROM), a rewritable compact disc (CD-R/W), and digital video disc (DVD).

A data processing system (e.g., processor 1022 shown in FIG. 10) is suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

While various embodiments have been described above in the context of a master-slave arrangement, any wireless protocol using any wireless communication standard may be supported by the systems and methods described herein. In addition, although Bluetooth devices are specifically used in some of the illustrative examples described herein, any electronic device may be adapted to support the facilitated device connection and pairing techniques disclosed herein. For example, devices may initiate facilitated connections with other devices, peripherals and APs. Furthermore, it is to be understood that the various embodiments described above may be used and adapted for other types of delays not specifically described herein. It is to be understood that the examples and embodiments described above are for illustrative purposes only and that various modifications or changes in light thereof will be suggested to persons skilled in the art, and are to be included within the spirit and purview of this application and scope of the appended claims. Therefore, the above description should not be understood as limiting the scope of the invention as defined by the claims.

What is claimed is:

1. A method of protecting an occupant in a vehicle turret, comprising:
   detecting, by one or more computer processors, an event in the vehicle;
   deploying a plurality of airbags at least partially in the vehicle turret,
   wherein, the turret includes a first opening configured to allow access to the turret from an interior of the vehicle, and to at least partially accommodate a human torso, and a wall at least partially surrounding said first opening, and
   the plurality of airbags are arranged at least partially around the first opening, and deploy between the first opening and the wall.

2. The method of claim 1, wherein said airbags are substantially cylindrical when deployed.

3. The method of claim 2, wherein said airbags are configured to deploy upward.

4. The method of claim 1, wherein the turret includes a weapon mount, and at least one of the airbags is deployed between the first opening and the weapon mount.

5. The method of claim 1, wherein the airbags are included in a padding around the first opening, and deploy upward.

6. The method of claim 1, wherein the airbags are included in at least one of the wall or an overhead of the turret.

7. The method of claim 6, wherein said airbags are included in said wall and are configured to deploy at least partially inward.

8. The method of claim 6, wherein said airbags are included in said overhead of the turret and are configured to deploy at least partially downward.

9. The method of claim 1, wherein the turret includes a second opening defining an interface between an inside of the turret and an outside of the turret, and at least one of the airbags is deployed to at least partially obstruct the second opening when deployed.

10. The method of claim 1, further comprising:
using a first sensor device including a plurality of sensors to detect the event;
using a processor in communication with said first sensor device, to automatically initiate at least one blast countermeasure and said airbags based on results of detecting the event;
wherein, initiating the airbags is based at least in part on signals received from said first sensor device exceeding a first threshold, and
wherein, initiating the blast countermeasure is based at least in part on the signals exceeding a second threshold, the second threshold being greater than the first threshold.

11. The method of claim 10, wherein the processor is further configured to initiate the airbags based on signals received from different sensor packages associated with different areas of the vehicle, and to selectively initiate individual blast countermeasures in different areas of the vehicle based on signals received from different sensor packages associated with each of the different areas of the vehicle.

12. The method of claim 10, wherein the second threshold is greater than 30 g.

13. The method of claim 10, wherein the at least one blast countermeasure includes one or more of a mass ejector and a thruster.

14. The method of claim 10, wherein a second sensor device senses a different type of condition than the first sensor device, and the processor processes signals received from said second sensor device in determining whether to initiate at least one of the airbags or the blast countermeasure.

15. The method of claim 1, wherein the event is at least one of a rollover event, an impact event, and an explosive event.

16. The method of claim 15, wherein the method includes deploying different combinations of the airbags and blast countermeasures based on a determination of whether the event is a rollover event, an impact event, and an explosive event.

17. The method of claim 1, further comprising deploying a blast countermeasure based at least in part on detecting the event.

18. The method of claim 17, wherein the blast countermeasure includes one or more of a mass ejector and a thruster configured to counteract a sensed acceleration of the vehicle.

19. The method of claim 1, further comprising selectively activating a blast countermeasure based at least in part on a determination as to whether or not the event is an explosive event.

20. The method claim 19, wherein the processor is configured to apply different predetermined thresholds in deploying the airbags and activating the blast countermeasure.

* * * * *